United States Patent
Pike et al.

(10) Patent No.: US 12,102,972 B2
(45) Date of Patent: Oct. 1, 2024

(54) METHOD FOR ADJUSTING A BLEND COMPOSITION

(71) Applicant: Covestro LLC, Pittsburgh, PA (US)

(72) Inventors: Timothy J Pike, Bethel Park, PA (US); Devin W Ulam, Pittsburgh, PA (US); Christopher P Neff, Paden City, WV (US)

(73) Assignee: Covestro LLC, Pittsburgh, PA (US)

( * ) Notice: Subject to any disclaimer, the term of this patent is extended or adjusted under 35 U.S.C. 154(b) by 391 days.

(21) Appl. No.: 17/635,645

(22) PCT Filed: Aug. 27, 2020

(86) PCT No.: PCT/US2020/048169
§ 371 (c)(1),
(2) Date: Feb. 15, 2022

(87) PCT Pub. No.: WO2021/041651
PCT Pub. Date: Mar. 4, 2021

(65) Prior Publication Data
US 2022/0323919 A1    Oct. 13, 2022

Related U.S. Application Data

(60) Provisional application No. 62/893,234, filed on Aug. 29, 2019.

(51) Int. Cl.
*G05D 11/13* (2006.01)
*B01F 23/40* (2022.01)
(Continued)

(52) U.S. Cl.
CPC .......... *B01F 35/883* (2022.01); *B01F 23/405* (2022.01); *B01F 35/82* (2022.01); *G05D 11/139* (2013.01)

(58) Field of Classification Search
CPC ...... B01F 35/883; B01F 23/405; B01F 35/82; G05D 11/139; G05D 21/02
See application file for complete search history.

(56) References Cited

U.S. PATENT DOCUMENTS 7,281,840 B2    10/2007  Simpson et al.
7,344,297 B2     3/2008  Urquhart
(Continued)

OTHER PUBLICATIONS

International Search Report Issued for PCT/US2020/048169 on Jan. 18, 2021 by Authorized officer Polednicek, Milos.

*Primary Examiner* — Yuhui R Pan
(74) *Attorney, Agent, or Firm* — Richard P. Bender

(57) ABSTRACT

A method for adjusting a blend composition includes: receiving target blend composition data associated with a target blend composition having a target blend property; controlling blend component flow streams to cause blend components to be added to a blend tank to form a blend composition; determining a property of the blend composition; comparing the property of the blend composition with the target blend property; generating control flow instructions based on the property of the blend composition and a machine learning analysis of historical blend data; and adjusting a blend component flow stream of the blend component flow streams to form a modified blend composition in the blend tank.

17 Claims, 4 Drawing Sheets

(51) Int. Cl.
  *B01F 35/82* (2022.01)
  *B01F 35/88* (2022.01)

(56) References Cited

U.S. PATENT DOCUMENTS

| | | | |
|---|---|---|---|
| 7,905,653 B2 | 3/2011 | Wilmer et al. | |
| 2005/0273203 A1 | 12/2005 | Bellafiore et al. | |
| 2008/0140366 A1* | 6/2008 | Gao ........................ | G01N 31/00 703/2 |
| 2020/0206975 A1* | 7/2020 | Urdaneta ................ | B28C 9/004 |

* cited by examiner

METHOD FOR ADJUSTING A BLEND COMPOSITION

CROSS-REFERENCE TO RELATED APPLICATIONS

This application is a national stage application under 35 U.S.C. 371 of PCT/US2020/048169, filed Aug. 27, 2020, which claims the benefit of U.S. provisional application, Ser. No. 62/893,234, filed Aug. 29, 2019, each of which is incorporated herein by reference.

BACKGROUND

1. Field

The present disclosure relates to blend compositions and, in some non-limiting embodiments or aspects, to methods, systems, and computer program products for adjusting a blend composition.

2. Technical Considerations

As components are mixed together to form a blend composition, the blend composition is tested to determine whether it satisfies certain blend specifications. It is oftentimes the case that the blend composition does not satisfy the desired blend specifications. These non-compliant blend compositions are either discarded or adjusted so as to meet the blend specifications.

Adjusting non-compliant blend compositions so that the blend specifications are met can be a complex process with multiple ways of adjusting the non-compliant blend composition to arrive at the blend specifications. Furthermore, there are many different variables to consider in determining what adjustment should be made, as well as previously adjusted blend compositions that offer data including the cost, performance and volume associated with such adjustments. Therefore, a method of optimizing the adjustment of non-compliant blend compositions such that the desired blend specifications are obtained efficiently is desirable.

SUMMARY

According to some non-limiting embodiments or aspects, a method for adjusting a blend composition includes: receiving, with at least one processor, target blend composition data associated with a target blend composition having at least one target blend property, where the target blend composition includes a plurality of blend components, and the target blend composition data includes a target concentration associated with each of the plurality of blend components; controlling, with at least one processor, a plurality of blend component flow streams to cause the plurality of blend components to be added to a blend tank to form a blend composition; determining, with at least one processor, at least one property of the blend composition; comparing, with at least one processor, the at least one property of the blend composition with the at least one target blend property; generating, with at least one processor, control flow instructions based on the at least one property of the blend composition and a machine learning analysis of historical blend data; and adjusting, with at least one processor, at least one blend component flow stream of the plurality of blend component flow streams to form a modified blend composition in the blend tank.

In some non-limiting embodiments or aspects, the modified blend composition may have a concentration that matches the target concentration associated with each of the plurality of blend components or a property that satisfies the at least one target blend property. The method may include determining an updated target blend composition having at least one updated target blend property based on the historical blend data, and the control flow instructions may be configured such that the modified blend composition matches the updated target blend composition. Generating the control flow instructions may include: generating, with at least one processor, a plurality of proposed control flow instructions to achieve the target blend composition or the at least one target blend property, based on a machine learning analysis of the historical blend data; determining, with at least one processor, a cost associated with each of the plurality of proposed control flow instructions; and generating the control flow instructions based on the cost associated with each of the plurality of proposed control flow instructions. Generating the control flow instructions may include: generating, with at least one processor, a plurality of proposed control flow instructions to achieve the target blend composition or the at least one target blend property based on a machine learning analysis of the historical blend data, where the target blend composition data may include a target volume; determining, with at least one processor, a projected modified blend composition volume associated with each of the plurality of proposed control flow instructions; and generating the control flow instructions based on the projected modified blend composition volume associated with each of the plurality of proposed control flow instructions and the target volume. The target blend composition data may include a target volume, and the control flow instructions may include proposed control flow instructions of the plurality of proposed control flow instructions based on a comparison of the projected modified blend composition volume and the target volume. The method may include removing at least a portion of the blend composition from the blend tank prior to and/or during adjusting the at least one blend component flow stream. The plurality of blend components may be non-reactive with one another to form the blend composition. The at least one property of the blend composition and the at least one target blend property may have a difference, the historical blend data may include data associated with a historical blend composition having a substantially similar difference between the same at least one property of the historical blend composition and a target blend property of the historical blend composition, where the data associated with a historical blend composition may include control flow instructions associated with preparing the historical blend composition, where the control flow instructions may be generated for the blend composition based on the control flow instructions associated with preparing the historical blend composition. The method may include determining at least one updated target blend composition having the at least one target blend property based on the historical blend data, where the control flow instructions may be configured such that the modified blend composition matches the at least one updated target blend composition.

According to some non-limiting embodiments or aspects, a method for adjusting a blend composition includes: receiving, with at least one processor, target blend composition data associated with a target blend composition associated with a first order having at least one target blend property, where the target blend composition includes a plurality of blend components, and the target blend composition data includes a target concentration associated with each of the plurality of blend components; controlling, with at least one processor, a plurality of blend component flow streams to cause the plurality of blend components to be added to a blend tank to form a blend composition; determining, with at least one processor, at least one property of the blend composition; comparing, with at least one processor, the at least one property of the blend composition with the at least one target blend property; determining an updated target blend composition having at least one updated target blend property; generating, with at least one processor, control flow instructions based on the at least one property of the blend composition and the at least one updated target blend property; and adjusting, with at least one processor, at least one blend component flow stream of the plurality of blend component flow streams to form the updated target blend composition in the blend tank.

In some non-limiting embodiments or aspects, the updated target blend composition may be associated with a second order different from the first order. Determining the updated target blend composition may be based on the at least one property of the blend composition and a machine learning analysis of historical blend data. The historical blend data may include historical blend data associated with the updated target blend composition. The at least one property of the blend composition and the at least one target blend property may have a first difference, and the at least one property of the blend composition and the at least one updated target blend property of the updated target blend composition may have a second difference, where the method may include comparing the first difference and the second difference. The method may include generating, with at least one processor, proposed control flow instructions to achieve the target blend composition and proposed control flow instructions to achieve the updated target blend composition; and determining, with at least one processor, a cost associated with each of the proposed control flow instructions to achieve the target blend composition and the proposed control flow instructions to achieve the updated target blend composition. The method may include determining, with at least one processor, that the cost associated with the proposed control flow instructions to achieve the target blend composition exceeds the cost associated with the proposed control flow instructions to achieve the updated target blend composition. Generating the control flow instructions may include generating, with at least one processor, a plurality of proposed control flow instructions to achieve the updated target blend composition or the at least one updated target blend property; determining, with at least one processor, a cost associated with each of the plurality of proposed control flow instructions; and generating the control flow instructions based on the cost associated with each of the plurality of proposed control flow instructions. Generating the plurality of proposed control flow instructions to achieve the updated target blend composition or the at least one updated target blend property may be based on a machine learning analysis of historical blend data. The plurality of blend components may be non-reactive with one another to form the updated target blend composition.

According to some non-limiting embodiments or aspects, a system for adjusting a blend composition includes at least one processor programmed or configured to: receive target blend composition data associated with a target blend composition having at least one target blend property, where the target blend composition includes a plurality of blend components, and the target blend composition data includes a target concentration associated with each of the plurality of blend components; control a plurality of blend component flow streams to cause the plurality of blend components to be added to a blend tank to form a blend composition; determine at least one property of the blend composition; compare the at least one property of the blend composition with the at least one target blend property; generate control flow instructions based on the at least one property of the blend composition and a machine learning analysis of historical blend data; and adjust at least one blend component flow stream of the plurality of blend component flow streams to form a modified blend composition in the blend tank.

In some non-limiting embodiments or aspects, the modified blend composition may have a concentration that matches the target concentration associated with each of the plurality of blend components or a property that satisfies the at least one target blend property. The at least one processor may be programmed or configured to: determine an updated target blend composition having at least one updated target blend property based on the historical blend data, where the control flow instructions may be configured such that the modified blend composition matches the updated target blend composition. Generating the control flow instructions may include the at least one processor being programmed or configured to: generate a plurality of proposed control flow instructions to achieve the target blend composition or the at least one target blend property, based on a machine learning analysis of the historical blend data; determine a cost associated with each of the plurality of proposed control flow instructions; and generate the control flow instructions based on the cost associated with each of the plurality of proposed control flow instructions. Generating the control flow instructions may include the at least one processor being programmed or configured to: generate a plurality of proposed control flow instructions to achieve the target blend composition or the at least one target blend property based on a machine learning analysis of the historical blend data, where the target blend composition data may include a target volume; determine a projected modified blend composition volume associated with each of the plurality of proposed control flow instructions; and generate the control flow instructions based on the projected modified blend composition volume associated with each of the plurality of proposed control flow instructions and the target volume. The target blend composition data may include a target volume, and the control flow instructions may include proposed control flow instructions of the plurality of proposed control flow instructions based on a comparison of the projected modified blend composition volume and the target volume. The at least one processor may be programmed or configured to: remove at least a portion of the blend composition from the blend tank, prior to and/or during adjusting the at least one blend component flow stream. The plurality of blend components may be non-reactive with one another to form the blend composition. The at least one property of the blend composition and the at least one target blend property may have a difference, where the historical blend data may include data associated with a historical blend composition having a substantially similar difference between the same at least one property of the historical blend composition and a target blend property of the historical blend composition, where the data associated with a historical blend composition may include control flow instructions associated with preparing the historical blend composition, where the control flow instructions may be generated for the blend composition based on the control flow instructions associated with preparing the historical blend composition.

The at least one processor may be programmed or configured to determine at least one updated target blend composition having the at least one target blend property based on the historical blend data, where the control flow instructions may be configured such that the modified blend composition matches the at least one updated target blend composition.

According to some non-limiting embodiments or aspects, a system for adjusting a blend composition includes at least one processor programmed or configured to: receive target blend composition data associated with a target blend composition associated with a first order having at least one target blend property, where the target blend composition includes a plurality of blend components, and the target blend composition data includes a target concentration associated with each of the plurality of blend components; control a plurality of blend component flow streams to cause the plurality of blend components to be added to a blend tank to form a blend composition; determine at least one property of the blend composition; compare the at least one property of the blend composition with the at least one target blend property; determine an updated target blend composition having at least one updated target blend property; generate control flow instructions based on the at least one property of the blend composition and the at least one updated target blend property; and adjust at least one blend component flow stream of the plurality of blend component flow streams to form the updated target blend composition in the blend tank.

In some non-limiting embodiments or aspects, the updated target blend composition may be associated with a second order different from the first order. Determining the updated target blend composition may be based on the at least one property of the blend composition and a machine learning analysis of historical blend data. The historical blend data may include historical blend data associated with the updated target blend composition. The at least one property of the blend composition and the at least one target blend property may have a first difference, where the at least one property of the blend composition and the at least one updated target blend property of the updated target blend composition may have a second difference, where the at least one processor may be programmed or configured to compare the first difference and the second difference. The at least one processor may be programmed or configured to generate proposed control flow instructions to achieve the target blend composition and proposed control flow instructions to achieve the updated target blend composition; and determine a cost associated with each of the proposed control flow instructions to achieve the target blend composition and the proposed control flow instructions to achieve the updated target blend composition. The at least one processor may be programmed or configured to determine that the cost associated with the proposed control flow instructions to achieve the target blend composition exceeds the cost associated with the proposed control flow instructions to achieve the updated target blend composition. Generating the control flow instructions may include the at least one processor being programmed or configured to: generate a plurality of proposed control flow instructions to achieve the updated target blend composition or the at least one updated target blend property; determine a cost associated with each of the plurality of proposed control flow instructions; and generate the control flow instructions based on the cost associated with each of the plurality of proposed control flow instructions. Generating the plurality of proposed control flow instructions to achieve the updated target blend composition or the at least one updated target blend property may be based on a machine learning analysis of historical blend data. The plurality of blend components may be non-reactive with one another to form the updated target blend composition.

According to some non-limiting embodiments or aspects, a computer program product for adjusting a blend composition includes at least one non-transitory computer-readable medium including one or more instructions that, when executed by at least one processor, cause the at least one processor to: receive target blend composition data associated with a target blend composition having at least one target blend property, where the target blend composition includes a plurality of blend components, and the target blend composition data includes a target concentration associated with each of the plurality of blend components; control a plurality of blend component flow streams to cause the plurality of blend components to be added to a blend tank to form a blend composition; determine at least one property of the blend composition; compare the at least one property of the blend composition with the at least one target blend property; generate control flow instructions based on the at least one property of the blend composition and a machine learning analysis of historical blend data; and adjust at least one blend component flow stream of the plurality of blend component flow streams to form a modified blend composition in the blend tank.

In some non-limiting embodiments or aspects, the modified blend composition may have a concentration that matches the target concentration associated with each of the plurality of blend components or a property that satisfies the at least one target blend property. The one or more instructions may cause the at least one processor to determine an updated target blend composition having at least one updated target blend property based on the historical blend data, where the control flow instructions may be configured such that the modified blend composition matches the updated target blend composition. Generating the control flow instructions may include the one or more instructions causing the at least one processor to: generate a plurality of proposed control flow instructions to achieve the target blend composition or the at least one target blend property, based on a machine learning analysis of the historical blend data; determine a cost associated with each of the plurality of proposed control flow instructions; and generate the control flow instructions based on the cost associated with each of the plurality of proposed control flow instructions. Generating the control flow instructions may include the one or more instructions causing the at least one processor to: generate a plurality of proposed control flow instructions to achieve the target blend composition or the at least one target blend property based on a machine learning analysis of the historical blend data, where the target blend composition data may include a target volume; determine a projected modified blend composition volume associated with each of the plurality of proposed control flow instructions; and generate the control flow instructions based on the projected modified blend composition volume associated with each of the plurality of proposed control flow instructions and the target volume. The target blend composition data may include a target volume, and where the control flow instructions may include proposed control flow instructions of the plurality of proposed control flow instructions based on a comparison of the projected modified blend composition volume and the target volume. The one or more instructions may cause the at least one processor to remove at least a portion of the blend composition from the blend tank, prior to and/or during adjusting the at least one blend component flow stream. The plurality of blend components may be non-reactive with one another to form the blend composition. The at least one property of the blend composition and the at least one target blend property may have a difference, and the historical blend data may include data associated with a historical blend composition having a substantially similar difference between the same at least one property of the historical blend composition and a target blend property of the historical blend composition, where the data associated with a historical blend composition may include control flow instructions associated with preparing the historical blend composition, where the control flow instructions may be generated for the blend composition based on the control flow instructions associated with preparing the historical blend composition. The one or more instructions may cause the at least one processor to determine at least one updated target blend composition having the at least one target blend property based on the historical blend data, where the control flow instructions may be configured such that the modified blend composition matches the at least one updated target blend composition.

According to some non-limiting embodiments or aspects, a computer program product for adjusting a blend composition includes at least one non-transitory computer-readable medium including one or more instructions that, when executed by at least one processor, cause the at least one processor to: receive target blend composition data associated with a target blend composition associated with a first order having at least one target blend property, where the target blend composition includes a plurality of blend components, and the target blend composition data includes a target concentration associated with each of the plurality of blend components; control a plurality of blend component flow streams to cause the plurality of blend components to be added to a blend tank to form a blend composition; determine at least one property of the blend composition; compare the at least one property of the blend composition with the at least one target blend property; determine an updated target blend composition having at least one updated target blend property; generate control flow instructions based on the at least one property of the blend composition and the at least one updated target blend property; and adjust at least one blend component flow stream of the plurality of blend component flow streams to form the updated target blend composition in the blend tank.

In some non-limiting embodiments or aspects, the updated target blend composition may be associated with a second order different from the first order. Determining the updated target blend composition may be based on the at least one property of the blend composition and a machine learning analysis of historical blend data. The historical blend data may include historical blend data associated with the updated target blend composition. The at least one property of the blend composition and the at least one target blend property may have a first difference, where the at least one property of the blend composition and the at least one updated target blend property of the updated target blend composition may have a second difference, where the one or more instructions may cause the at least one processor to compare the first difference and the second difference. The one or more instructions may cause the at least one processor to generate proposed control flow instructions to achieve the target blend composition and proposed control flow instructions to achieve the updated target blend composition; and determine a cost associated with each of the proposed control flow instructions to achieve the target blend composition and the proposed control flow instructions to achieve the updated target blend composition. The one or more instructions may cause the at least one processor to determine that the cost associated with the proposed control flow instructions to achieve the target blend composition exceeds the cost associated with the proposed control flow instructions to achieve the updated target blend composition. Generating the control flow instructions may include the one or more instructions causing the at least one processor to generate a plurality of proposed control flow instructions to achieve the updated target blend composition or the at least one updated target blend property; determine a cost associated with each of the plurality of proposed control flow instructions; and generate the control flow instructions based on the cost associated with each of the plurality of proposed control flow instructions. Generating the plurality of proposed control flow instructions to achieve the updated target blend composition or the at least one updated target blend property may be based on a machine learning analysis of historical blend data. The plurality of blend components may be non-reactive with one another to form the updated target blend composition.

Further embodiments or aspects are set forth in the following numbered clauses:

Clause 1: A method for adjusting a blend composition, comprising: receiving, with at least one processor, target blend composition data associated with a target blend composition having at least one target blend property, wherein the target blend composition comprises a plurality of blend components, and the target blend composition data comprises a target concentration associated with each of the plurality of blend components; controlling, with at least one processor, a plurality of blend component flow streams to cause the plurality of blend components to be added to a blend tank to form a blend composition; determining, with at least one processor, at least one property of the blend composition; comparing, with at least one processor, the at least one property of the blend composition with the at least one target blend property; generating, with at least one processor, control flow instructions based on the at least one property of the blend composition and a machine learning analysis of historical blend data; and adjusting, with at least one processor, at least one blend component flow stream of the plurality of blend component flow streams to form a modified blend composition in the blend tank.

Clause 2: The method of clause 1, wherein the modified blend composition has a concentration that matches the target concentration associated with each of the plurality of blend components or a property that satisfies the at least one target blend property.

Clause 3: The method of clause 1 or 2, further comprising: determining an updated target blend composition having at least one updated target blend property based on the historical blend data, wherein the control flow instructions are configured such that the modified blend composition matches the updated target blend composition.

Clause 4: The method of any of clauses 1-3, wherein generating the control flow instructions comprises: generating, with at least one processor, a plurality of proposed control flow instructions to achieve the target blend composition or the at least one target blend property, based on a machine learning analysis of the historical blend data; determining, with at least one processor, a cost associated with each of the plurality of proposed control flow instructions; and generating the control flow instructions based on the cost associated with each of the plurality of proposed control flow instructions.

Clause 5: The method of any of clauses 1-4, wherein generating the control flow instructions comprises: generating, with at least one processor, a plurality of proposed control flow instructions to achieve the target blend composition or the at least one target blend property based on a machine learning analysis of the historical blend data, wherein the target blend composition data further comprises a target volume; determining, with at least one processor, a projected modified blend composition volume associated with each of the plurality of proposed control flow instructions; and generating the control flow instructions based on the projected modified blend composition volume associated with each of the plurality of proposed control flow instructions and the target volume.

Clause 6: The method of clause 4 or 5, wherein the target blend composition data further comprises a target volume, and wherein the control flow instructions comprise proposed control flow instructions of the plurality of proposed control flow instructions based on a comparison of projected modified blend composition volume and the target volume.

Clause 7: The method of clause 6, further comprising: removing at least a portion of the blend composition from the blend tank, prior to and/or during adjusting the at least one blend component flow stream.

Clause 8: The method of any of clauses 1-7, wherein the plurality of blend components are non-reactive with one another to form the blend composition.

Clause 9: The method of any of clauses 1-8, wherein the at least one property of the blend composition and the at least one target blend property have a difference, wherein the historical blend data comprises data associated with a historical blend composition having a substantially similar difference between the same at least one property of the historical blend composition and a target blend property of the historical blend composition, wherein the data associated with a historical blend composition comprises control flow instructions associated with preparing the historical blend composition, wherein the control flow instructions are generated for the blend composition based on the control flow instructions associated with preparing the historical blend composition.

Clause 10: The method of any of clauses 1-9, further comprising: determining at least one updated target blend composition having the at least one target blend property based on the historical blend data, wherein the control flow instructions are configured such that the modified blend composition matches the at least one updated target blend composition.

Clause 11: A method for adjusting a blend composition, comprising: receiving, with at least one processor, target blend composition data associated with a target blend composition associated with a first order having at least one target blend property, wherein the target blend composition comprises a plurality of blend components, and the target blend composition data comprises a target concentration associated with each of the plurality of blend components; controlling, with at least one processor, a plurality of blend component flow streams to cause the plurality of blend components to be added to a blend tank to form a blend composition; determining, with at least one processor, at least one property of the blend composition; comparing, with at least one processor, the at least one property of the blend composition with the at least one target blend property; determining an updated target blend composition having at least one updated target blend property; generating, with at least one processor, control flow instructions based on the at least one property of the blend composition and the at least one updated target blend property; and adjusting, with at least one processor, at least one blend component flow stream of the plurality of blend component flow streams to form the updated target blend composition in the blend tank.

Clause 12: The method of clause 11, wherein the updated target blend composition is associated with a second order different from the first order.

Clause 13: The method of clause 11 or 12, wherein determining the updated target blend composition is based on the at least one property of the blend composition and a machine learning analysis of historical blend data.

Clause 14: The method of clause 13, wherein the historical blend data comprises historical blend data associated with the updated target blend composition.

Clause 15: The method of any of clauses 11-14, wherein the at least one property of the blend composition and the at least one target blend property have a first difference, wherein the at least one property of the blend composition and the at least one updated target blend property of the updated target blend composition have a second difference, wherein the method further comprises comparing the first difference and the second difference.

Clause 16: The method of any of clauses 11-15, further comprising: generating, with at least one processor, proposed control flow instructions to achieve the target blend composition and proposed control flow instructions to achieve the updated target blend composition; and determining, with at least one processor, a cost associated with each of the proposed control flow instructions to achieve the target blend composition and the proposed control flow instructions to achieve the updated target blend composition.

Clause 17: The method of clause 16, further comprising: determining, with at least one processor, that the cost associated with the proposed control flow instructions to achieve the target blend composition exceeds the cost associated with the proposed control flow instructions to achieve the updated target blend composition.

Clause 18: The method of any of clauses 11-17, wherein generating the control flow instructions comprises: generating, with at least one processor, a plurality of proposed control flow instructions to achieve the updated target blend composition or the at least one updated target blend property; determining, with at least one processor, a cost associated with each of the plurality of proposed control flow instructions; and generating the control flow instructions based on the cost associated with each of the plurality of proposed control flow instructions.

Clause 19: The method of clause 18, wherein generating the plurality of proposed control flow instructions to achieve the updated target blend composition or the at least one updated target blend property is based on a machine learning analysis of historical blend data.

Clause 20: The method of any of clauses 11-19, wherein the plurality of blend components are non-reactive with one another to form the updated target blend composition.

Clause 21: A system for adjusting a blend composition, comprising at least one processor programmed or configured to: receive target blend composition data associated with a target blend composition having at least one target blend property, wherein the target blend composition comprises a plurality of blend components, and the target blend composition data comprises a target concentration associated with each of the plurality of blend components; control a plurality of blend component flow streams to cause the plurality of blend components to be added to a blend tank to form a blend composition; determine at least one property of the blend composition; compare the at least one property of the blend composition with the at least one target blend property; generate control flow instructions based on the at least one property of the blend composition and a machine learning analysis of historical blend data; and adjust at least one blend component flow stream of the plurality of blend component flow streams to form a modified blend composition in the blend tank.

Clause 22: The system of clause 21, wherein the modified blend composition has a concentration that matches the target concentration associated with each of the plurality of blend components or a property that satisfies the at least one target blend property.

Clause 23: The system of clause 21 or 22, wherein the at least one processor is programmed or configured to: determine an updated target blend composition having at least one updated target blend property based on the historical blend data, wherein the control flow instructions are configured such that the modified blend composition matches the updated target blend composition.

Clause 24: The system of any of clauses 21-23, wherein generating the control flow instructions comprises the at least one processor being programmed or configured to: generate a plurality of proposed control flow instructions to achieve the target blend composition or the at least one target blend property, based on a machine learning analysis of the historical blend data; determine a cost associated with each of the plurality of proposed control flow instructions; and generate the control flow instructions based on the cost associated with each of the plurality of proposed control flow instructions.

Clause 25: The system of any of clauses 21-24, wherein generating the control flow instructions comprises the at least one processor being programmed or configured to: generate a plurality of proposed control flow instructions to achieve the target blend composition or the at least one target blend property based on a machine learning analysis of the historical blend data, wherein the target blend composition data further comprises a target volume; determine a projected modified blend composition volume associated with each of the plurality of proposed control flow instructions; and generate the control flow instructions based on the projected modified blend composition volume associated with each of the plurality of proposed control flow instructions and the target volume.

Clause 26: The system of clause 24 or 25, wherein the target blend composition data further comprises a target volume, and wherein the control flow instructions comprise proposed control flow instructions of the plurality of proposed control flow instructions based on a comparison of projected modified blend composition volume and the target volume.

Clause 27: The system of clause 26, wherein the at least one processor is programmed or configured to: remove at least a portion of the blend composition from the blend tank, prior to and/or during adjusting the at least one blend component flow stream.

Clause 28: The system of any of clauses 21-27, wherein the plurality of blend components are non-reactive with one another to form the blend composition.

Clause 29: The system of any of clauses 21-28, wherein the at least one property of the blend composition and the at least one target blend property have a difference, wherein the historical blend data comprises data associated with a historical blend composition having a substantially similar difference between the same at least one property of the historical blend composition and a target blend property of the historical blend composition, wherein the data associated with a historical blend composition comprises control flow instructions associated with preparing the historical blend composition, wherein the control flow instructions are generated for the blend composition based on the control flow instructions associated with preparing the historical blend composition.

Clause 30: The system of any of clauses 21-29, wherein the at least one processor is programmed or configured to: determine at least one updated target blend composition having the at least one target blend property based on the historical blend data, wherein the control flow instructions are configured such that the modified blend composition matches the at least one updated target blend composition.

Clause 31: A system for adjusting a blend composition, comprising at least one processor programmed or configured to: receive target blend composition data associated with a target blend composition associated with a first order having at least one target blend property, wherein the target blend composition comprises a plurality of blend components, and the target blend composition data comprises a target concentration associated with each of the plurality of blend components; control a plurality of blend component flow streams to cause the plurality of blend components to be added to a blend tank to form a blend composition; determine at least one property of the blend composition; compare the at least one property of the blend composition with the at least one target blend property; determine an updated target blend composition having at least one updated target blend property; generate control flow instructions based on the at least one property of the blend composition and the at least one updated target blend property; and adjust at least one blend component flow stream of the plurality of blend component flow streams to form the updated target blend composition in the blend tank.

Clause 32: The system of clause 31, wherein the updated target blend composition is associated with a second order different from the first order.

Clause 33: The system of clause 31 or 32, wherein determining the updated target blend composition is based on the at least one property of the blend composition and a machine learning analysis of historical blend data.

Clause 34: The system of clause 33, wherein the historical blend data comprises historical blend data associated with the updated target blend composition.

Clause 35: The system of any of clauses 31-34, wherein the at least one property of the blend composition and the at least one target blend property have a first difference, wherein the at least one property of the blend composition and the at least one updated target blend property of the updated target blend composition have a second difference, wherein the at least one processor is programmed or configured to compare the first difference and the second difference.

Clause 36: The system of any of clauses 31-35, wherein the at least one processor is programmed or configured to: generate proposed control flow instructions to achieve the target blend composition and proposed control flow instructions to achieve the updated target blend composition; and determine a cost associated with each of the proposed control flow instructions to achieve the target blend composition and the proposed control flow instructions to achieve the updated target blend composition.

Clause 37: The system of clause 36, wherein the at least one processor is programmed or configured to: determine that the cost associated with the proposed control flow instructions to achieve the target blend composition exceeds the cost associated with the proposed control flow instructions to achieve the updated target blend composition.

Clause 38: The system of any of clauses 31-37, wherein generating the control flow instructions comprises the at least one processor being programmed or configured to: generate a plurality of proposed control flow instructions to achieve the updated target blend composition or the at least one updated target blend property; determine a cost associated with each of the plurality of proposed control flow instructions; and generate the control flow instructions based on the cost associated with each of the plurality of proposed control flow instructions.

Clause 39: The system of clause 38, wherein generating the plurality of proposed control flow instructions to achieve the updated target blend composition or the at least one updated target blend property is based on a machine learning analysis of historical blend data.

Clause 40: The system of any of clauses 31-39, wherein the plurality of blend components are non-reactive with one another to form the updated target blend composition.

Clause 41: A computer program product for adjusting a blend composition, the computer program product comprising at least one non-transitory computer-readable medium including one or more instructions that, when executed by at least one processor, cause the at least one processor to: receive target blend composition data associated with a target blend composition having at least one target blend property, wherein the target blend composition comprises a plurality of blend components, and the target blend composition data comprises a target concentration associated with each of the plurality of blend components; control a plurality of blend component flow streams to cause the plurality of blend components to be added to a blend tank to form a blend composition; determine at least one property of the blend composition; compare the at least one property of the blend composition with the at least one target blend property; generate control flow instructions based on the at least one property of the blend composition and a machine learning analysis of historical blend data; and adjust at least one blend component flow stream of the plurality of blend component flow streams to form a modified blend composition in the blend tank.

Clause 42: The computer program product of clause 41, wherein the modified blend composition has a concentration that matches the target concentration associated with each of the plurality of blend components or a property that satisfies the at least one target blend property.

Clause 43: The computer program product of clause 41 or 42, wherein the one or more instructions cause the at least one processor to: determine an updated target blend composition having at least one updated target blend property based on the historical blend data, wherein the control flow instructions are configured such that the modified blend composition matches the updated target blend composition.

Clause 44: The computer program product of any of clauses 41-43, wherein generating the control flow instructions comprises the one or more instructions causing the at least one processor to: generate a plurality of proposed control flow instructions to achieve the target blend composition or the at least one target blend property, based on a machine learning analysis of the historical blend data; determine a cost associated with each of the plurality of proposed control flow instructions; and generate the control flow instructions based on the cost associated with each of the plurality of proposed control flow instructions.

Clause 45: The computer program product of any of clauses 41-44, wherein generating the control flow instructions comprises the one or more instructions causing the at least one processor to: generate a plurality of proposed control flow instructions to achieve the target blend composition or the at least one target blend property based on a machine learning analysis of the historical blend data, wherein the target blend composition data further comprises a target volume; determine a projected modified blend composition volume associated with each of the plurality of proposed control flow instructions; and generate the control flow instructions based on the projected modified blend composition volume associated with each of the plurality of proposed control flow instructions and the target volume.

Clause 46: The computer program product of clause 44 or 45, wherein the target blend composition data further comprises a target volume, and wherein the control flow instructions comprise proposed control flow instructions of the plurality of proposed control flow instructions based on a comparison of projected modified blend composition volume and the target volume.

Clause 47: The computer program product of clause 46 wherein the one or more instructions cause the at least one processor to: remove at least a portion of the blend composition from the blend tank, prior to and/or during adjusting the at least one blend component flow stream.

Clause 48: The computer program product of any of clauses 41-47, wherein the plurality of blend components are non-reactive with one another to form the blend composition.

Clause 49: The computer program product of any of clauses 41-48, wherein the at least one property of the blend composition and the at least one target blend property have a difference, wherein the historical blend data comprises data associated with a historical blend composition having a substantially similar difference between the same at least one property of the historical blend composition and a target blend property of the historical blend composition, wherein the data associated with a historical blend composition comprises control flow instructions associated with preparing the historical blend composition, wherein the control flow instructions are generated for the blend composition based on the control flow instructions associated with preparing the historical blend composition.

Clause 50: The computer program product of any of clauses 41-49, wherein the one or more instructions cause the at least one processor to: determine at least one updated target blend composition having the at least one target blend property based on the historical blend data, wherein the control flow instructions are configured such that the modified blend composition matches the at least one updated target blend composition.

Clause 51: A computer program product for adjusting a blend composition, the computer program product comprising at least one non-transitory computer-readable medium including one or more instructions that, when executed by at least one processor, cause the at least one processor to: receive target blend composition data associated with a target blend composition associated with a first order having at least one target blend property, wherein the target blend composition comprises a plurality of blend components, and the target blend composition data comprises a target concentration associated with each of the plurality of blend components; control a plurality of blend component flow streams to cause the plurality of blend components to be added to a blend tank to form a blend composition; determine at least one property of the blend composition; compare the at least one property of the blend composition with the at least one target blend property; determine an updated target blend composition having at least one updated target blend property; generate control flow instructions based on the at least one property of the blend composition and the at least one updated target blend property; and adjust at least one blend component flow stream of the plurality of blend component flow streams to form the updated target blend composition in the blend tank.

Clause 52: The computer program product of clause 51, wherein the updated target blend composition is associated with a second order different from the first order.

Clause 53: The computer program product of clause 51 or 52, wherein determining the updated target blend composition is based on the at least one property of the blend composition and a machine learning analysis of historical blend data.

Clause 54: The computer program product of clause 53, wherein the historical blend data comprises historical blend data associated with the updated target blend composition.

Clause 55: The computer program product of any of clauses 51-54, wherein the at least one property of the blend composition and the at least one target blend property have a first difference, wherein the at least one property of the blend composition and the at least one updated target blend property of the updated target blend composition have a second difference, wherein the one or more instructions cause the at least one processor to compare the first difference and the second difference.

Clause 56: The computer program product of any of clauses 51-55, wherein the one or more instructions cause the at least one processor to: generate proposed control flow instructions to achieve the target blend composition and proposed control flow instructions to achieve the updated target blend composition; and determine a cost associated with each of the proposed control flow instructions to achieve the target blend composition and the proposed control flow instructions to achieve the updated target blend composition.

Clause 57: The computer program product of clause 56, wherein the one or more instructions cause the at least one processor to: determine that the cost associated with the proposed control flow instructions to achieve the target blend composition exceeds the cost associated with the proposed control flow instructions to achieve the updated target blend composition.

Clause 58: The computer program product of any of clauses 51-57, wherein generating the control flow instructions comprises the one or more instructions causing the at least one processor to: generate a plurality of proposed control flow instructions to achieve the updated target blend composition or the at least one updated target blend property; determine a cost associated with each of the plurality of proposed control flow instructions; and generate the control flow instructions based on the cost associated with each of the plurality of proposed control flow instructions.

Clause 59: The computer program product of clause 58, wherein generating the plurality of proposed control flow instructions to achieve the updated target blend composition or the at least one updated target blend property is based on a machine learning analysis of historical blend data.

Clause 60: The computer program product of any of clauses 51-59, wherein the plurality of blend components are non-reactive with one another to form the updated target blend composition.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

DETAILED DESCRIPTION

Figure 1:
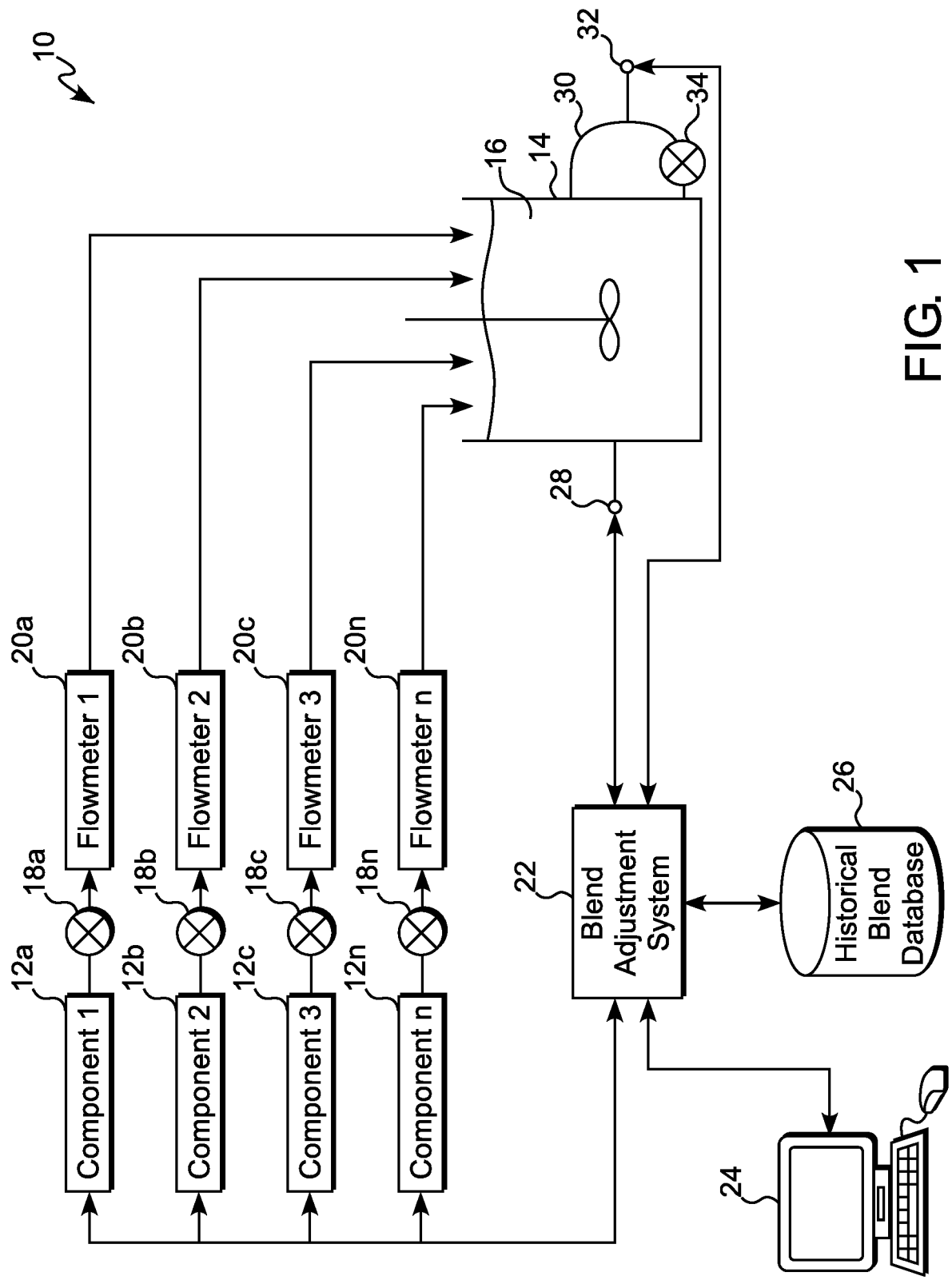
FIG. 1 shows a system for adjusting a blend composition according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects. Hence, specific dimensions and other physical characteristics related to the embodiments or aspects disclosed herein are not to be considered as limiting.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet, and/or the like) that includes data. It will be appreciated that numerous other arrangements are possible.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer, server, or other form of non-mobile computer.

As used herein, the term "machine learning algorithm" may refer to an algorithm for applying at least one predictive model to a data set. A machine learning algorithm may train at least one predictive model through expansion of the data set by continually or intermittently updating the data set with results of instances of an industrial process. Examples of machine learning algorithms may include supervised and/or unsupervised techniques such as decision trees, gradient boosting, logistic regression, artificial neural networks, Bayesian statistics, learning automata, Hidden Markov Modeling, linear classifiers, quadratic classifiers, association rule learning, or the like. As used herein, the term "machine learning model" may refer to a predictive model at least partially generated by a machine learning algorithm.

As used herein, the term "blend composition" refers to a combination of a plurality of chemical components which form a composition having at least one specific property different from a specific property of each of the individual components thereof. The blend composition may be reactive, in which case at least two of the chemical components react to form the blend composition. The blend composition may be non-reactive, in which case none of the chemical components react to form the blend composition.

As used herein, the term "user interface" or "graphical user interface" refers to a generated display, such as one or more graphical user interfaces (GUIs) with which a user may interact, either directly or indirectly (e.g., through a keyboard, mouse, touchscreen, etc.).

Non-limiting embodiments or aspects of the present disclosure are directed to a method, system, and computer program product for adjusting a blend composition. Non-limiting embodiments or aspects may adjust a blend composition that does not meet a target blend property to form a modified blend composition that does meet a target blend property. The adjustment may be based on a machine learning analysis of historical blend data from previously prepared chemical compositions. The machine learning analysis may consider historical blend data associated with historical blend compositions having a substantially similar difference between an initial blend composition and final blend composition with respect to the similar or same target blend property. Non-limiting embodiments or aspects generate a plurality of proposed control flow instructions for adjusting the blend composition, which control flow instructions may consider properties expected to be achieved by adjusting the blend composition, expected costs associated with adjusting the blend composition, and/or the expected volume achieved by adjusting the blend composition. The control flow instructions may cause the modified blend composition achieved by the system to be an updated target blend composition different from the initial target blend composition, allowing the system to flexibly arrive at a blend composition that is most efficiently (e.g., cost efficiently) produced. Overall, the method, system, and computer program product may enable a user to efficiently adjust a non-compliant blend composition to arrive at a blend composition that meets target (initial or updated) blend properties.

Referring to FIG. 1, a system 10 for adjusting a blend composition is shown according to some non-limiting embodiments or aspects. The system 10 may include a plurality of blend components 12a-12n that are configured to be added to a blend tank 14 through blend component flow streams to form a blend composition 16. The blend components 12a-12n may be pumped into the blend tank 14 using at least one pump 18a-18n. At least one flow meter 20a-20n may be provided for monitoring and/or displaying the flow of each of the blend components 12a-12n flowing through the flow streams. The blend tank 14 may include a mixer configured to mix the blend composition 16. The speed of the mixer may be adjustable, and in some non-limiting embodiments or aspects, the mixer speed may be such that the blend composition 16 forms a homogenous blend.

The blend components 12a-12n may be solid components, liquid components, gas components, and/or some combination thereof. In some non-limiting examples, all of the blend components 12a-12n are liquid components. The blend components 12a-12n may include low viscosity liquids, such that they are pumpable through the flow streams and into the blend tank 14. The blend components 12a-12n may be reactive with the other of the blend components 12a-12n, non-reactive with the other of the blend components 12a-12n, or some combination thereof The blend composition 16 may be a solid, liquid, or gas composition. In some non-limiting embodiments or aspects, the blend composition is a liquid blend composition. In some non-limiting embodiments or aspects, the liquid blend composition may have a low solids content, such as including less than 5% solids, less than 2% solids, or 0% solids.

The blend composition 16 may be reactive or a non-reactive blend composition. A reactive blend composition 16 includes at least two components that react with one another to form the blend composition 16. A non-reactive blend composition 16 includes no components that react with one another to form the blend composition 16.

The prepared blend composition 16 may be used as a component to form another material, such as a solid material. The prepared blend composition 16 may be a reactant used to form the material. Thus, the prepared blend composition 16 may be flowed from the blend tank 14 to a reactor (not shown) for further processing, e.g., for preparation of the material.

With continued reference to FIG. 1, the system 10 may include a blend adjustment system 22 configured to control various other components of the system 10. The blend adjustment system 22 may communicate with the plurality of blend components 12a-12n (flow streams thereof and/or the pumps 18a-18n and/or flow meters 20a-20n associated therewith) to control the flow of the plurality of blend components 12a-12n into the blend tank 14. The blend adjustment system 22 may communicate with a computing device 24 of a user. The blend adjustment system 22 may communicate with a historical blend data database 26 containing data associated with historical blend compositions.

With continued reference to FIG. 1, the computing device 24 may include a user interface in which a user may specify target blend composition data associated with a target blend composition. The target blend composition data may include at least one target blend property associated with the target blend composition. The target blend property may be a property of the target blend composition desired by the user.

Non-limiting examples of target blend properties include, but are not limited to: a chemical property (e.g., an amount and/or concentration of a component, a hydroxyl value, an acid value, and the like), a mechanical testing property (e.g., tensile strength, compressional strength, flexural strength, torsional strength, impact strength, % elongation, modulus, shore hardness (shore A, shore D), and the like), a physical testing property (density, crystallinity, and the like), a thermal testing property (melting point, glass transition temperature (Tg), thermal conductivity, and the like), a rheological testing property (viscosity and the like), a barrier testing property (permeance and the like), a weathering and/or chemical resistance testing property (UV degradation and the like), an adhesion testing property (work of adhesion and the like), a flammability testing property (limiting oxygen index, Underwriters Laboratory (UL94) testing (e.g., flammability rating), and the like), an optical testing property (gloss, transparency, clarity, haze, color, surface aspect, refractive index, and the like), and an electrical testing property (electrical conductivity and the like). The target blend composition data may specify at least one component to be included in the blend composition and/or a target concentration associated with that component.

The target blend property (or other target blend composition data) may be dictated by a customer specification associated with a customer order for a blend composition. The blend adjustment system 22 may communicate with the computing device 24 to receive the target blend composition data specified by the user.

In response to receiving the target blend composition data, the blend adjustment system 22 may control the plurality of blend components 12a-12n (e.g., the flow streams thereof) to cause the plurality of blend components 12a-12n to be added to the blend tank 14 to form the blend composition 16 (an initial blend composition). During or after addition of the plurality of blend components 12a-12n, at least one property of the initial blend composition may be determined. Determining the property of the initial blend composition may include measuring the property of the initial blend composition. At least one sensor (e.g., a concentration sensor or other type of sensor) or other property measuring device may be included with the blend tank 14 for determining the blend property of the initial blend composition. A sensor 28 may be positioned in the blend tank 14 so as to measure the blend property of the initial blend composition in the blend tank 14. A measuring line 30 may be included so as to carry at least a portion of the initial blend composition out of the blend tank 14 for measuring the property. A sensor 32 may be disposed on the measuring line 30 for measuring the property. A pump 34 may be included for carrying the initial blend composition from the blend tank 14 through the measuring line 30 for measuring the property. Upon measuring the property, the initial blend composition flowed through the measuring line 30 may be flowed back into the blend tank 14.

The property of the initial blend composition may be determined continuously and/or periodically. The property may be determined during mixing of the initial blend composition and/or after mixing of the initial blend composition is complete.

The property of the initial blend composition may be communicated to the blend adjustment system 22. For example, the blend adjustment system 22 may communicate with the sensors 28, 30 to receive the property of the initial blend composition.

With continued reference to FIG. 1, in response to receiving the determined property of the initial blend composition, the blend adjustment system 22 may compare the property of the initial blend composition with the received target blend property. In response to determining that the initial blend composition satisfies the target blend property, the blend adjustment system 22 may communicate with the computing device 24 to alert the user that the blend composition 16 in the blend tank 14 satisfies the user-specified parameters for the blend composition. The blend adjustment system 22 may cause the compliant blend composition 16 to be flowed from the blend tank 14 for further processing, such as to fill a vessel for a customer order.

In response to determining that the initial blend composition does not satisfy at least one of the target blend properties, the blend adjustment system 22 may generate control flow instructions for adjusting the initial blend composition to form a modified blend composition. The control flow instructions may include at least one of the following: a change in the flow rate of at least one of the blend components 12a-12n, an addition of an additional blend component, a removal of a certain volume of the initial blend composition from the blend tank 14, additional mixing of the initial blend composition, a change in temperature of the initial blend composition, and any other suitable blend composition adjustment and/or processing step adjustment.

With continued reference to FIG. 1, the blend adjustment system 22 may generate the control flow instructions based on at least one of the following, the property of the initial blend composition, the target blend property, an updated target blend property, historical blend data from the historical blend data database 26 (and/or a machine learning analysis thereof based on a machine learning algorithm).

The historical blend data database 26 may store historical data associated with previously-prepared (historical) blend compositions. The historical blend data may include property data associated with the historical blend compositions. The historical blend data may include process data associated with preparing the historical blend compositions, such as the processing steps taken to achieve the historical blend compositions. The historical blend data may include intermediate blend data (e.g., property data) associated with intermediate blend compositions formed in the process of preparing the historical blend composition. The historical blend data may also store historical order data associated with orders from customers associated with historical blend compositions. The historical blend data may also store order data associated with newly-received and/or never prepared orders from customers associated with blend compositions. This order data may include data associated with blend compositions ordered and/or desired by various customers of the user. The historical blend data may include cost data associated with various blend components.

The control flow instructions may be based on a machine learning analysis of any of the data stored in the historical blend data database 26 using a machine learning algorithm. The machine learning analysis may include the blend adjustment system 22 generating predictive models based on the historical blend data. The predictive models may predict an expected property associated with the modified blend composition based on certain adjustments being made to the initial blend composition. The predictive models may be generated using interpolations of existing data, database lookups of matches, multiple regression models of compositional effects on polymeric properties, or any number of machine learning and neural network techniques and algorithms.

With continued reference to FIG. 1, the blend adjustment system 22 may generate at least one proposed control flow instruction for adjusting the initial blend composition. The blend adjustment system 22 may generate a plurality of proposed control flow instructions for adjusting the initial blend composition. The blend adjustment system 22 may communicate the proposed control flow instructions to the computing device 24 for review by the user. The user may select at least one of the proposed control flow instructions for implementation and/or request further proposed control flow instructions be generated by the blend adjustment system 22. In some non-limiting embodiments or aspects, the blend adjustment system 22 may implement proposed control flow instructions without user intervention by automatically implementing the proposed control flow instructions the blend adjustment system 22 determines to be optimal.

With continued reference to FIG. 1, the blend adjustment system 22 may adjust at least one component flow stream of the blend components 12a-12n to form a modified blend composition in the blend tank 14. The adjustment may be based on the implemented proposed control flow instructions selected by the user and/or determined by the blend adjustment system 22. In a non-limiting embodiment, the adjustment is made by blend adjustment system 22 without any selection by the user.

In response to adjusting the at least one component flow stream of the blend components 12a-12n to form the modified blend composition in the blend tank 14, at least one property of the modified blend composition may be determined. The at least one property of the modified blend composition may be determined as previously described in connection with the initial blend composition.

In some non-limiting embodiments or aspects, the modified blend composition may have a property that satisfies the target blend property, such as a concentration that matches the target concentration associated with each of the blend components 12a-12n. In this way, the modified blend composition may satisfy the target blend composition data initially received by the blend adjustment system 22.

In some non-limiting embodiments or aspects, the modified blend composition may have an updated target blend composition different from the initial target blend composition data (e.g., a different concentration of at least one of the blend components 12a-12n) but still has at least one initially specified target blend property.

In some non-limiting embodiments or aspects, the modified blend composition may have a property that satisfies the updated target blend property, such as a concentration that matches an updated target concentration associated with each of the blend components 12a-12n. The updated target blend property may be different from the initial target blend composition data, such that the modified blend composition is different from the blend composition initially desired by the user. In some non-limiting embodiments or aspects, the updated target blend property may be associated with another blend composition previously prepared by the user or from another order received by and to be prepared by the user. The blend adjustment system 22 may determine that the modified blend composition should be the updated blend composition having the update target blend property instead of the blend composition associated with the initially received target blend composition data (a different blend composition compared to what was originally desired should be prepared). This may be based on the adjustment to obtain the updated target blend composition being more efficient than preparing the originally-desired target blend composition.

Figure 2:
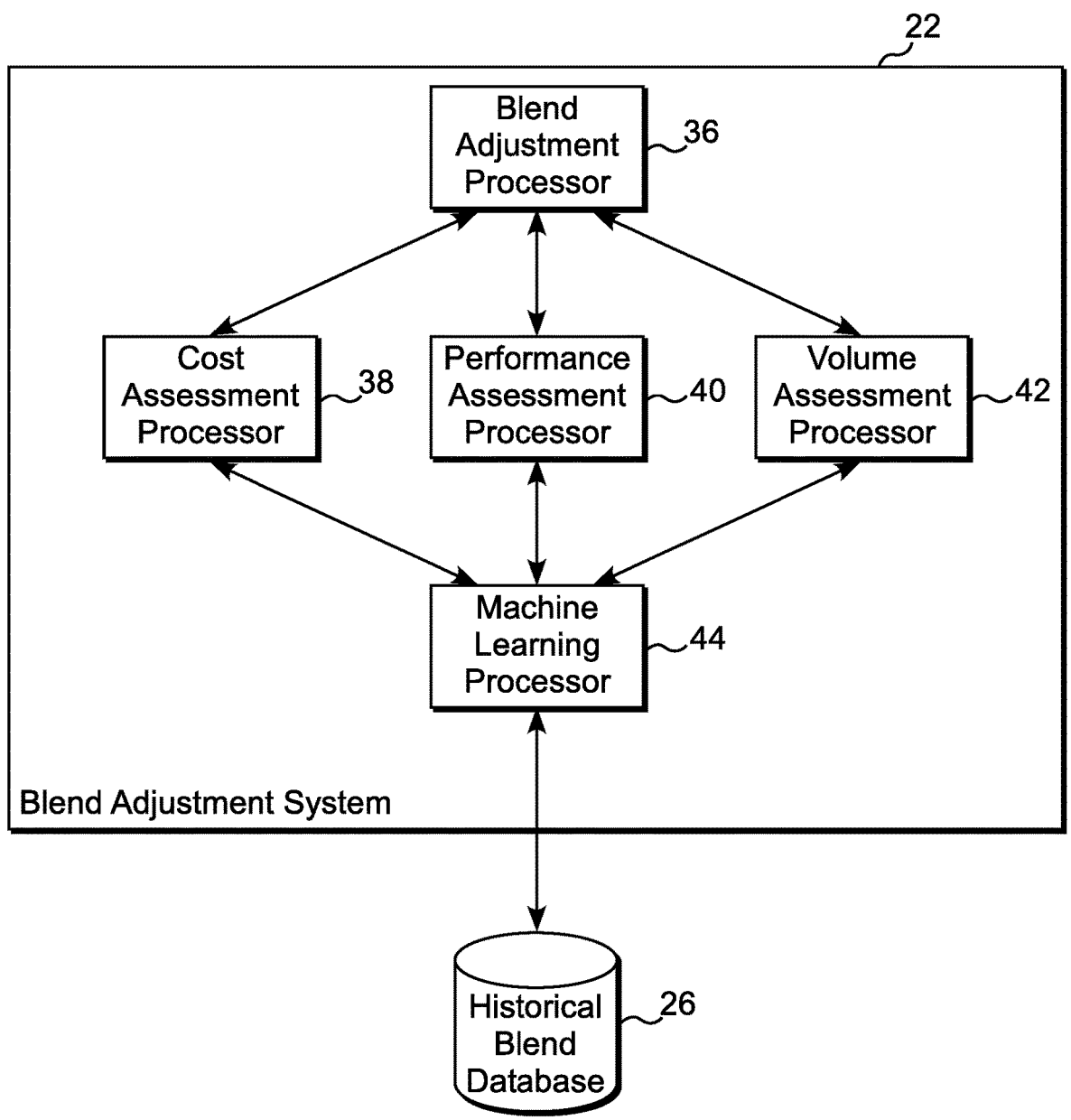
FIG. 2 shows a blend adjustment system used for adjusting a blend composition according to some non-limiting embodiments or aspects.

Referring to FIG. 2, the blend adjustment system 22 utilizing a machine learning algorithm is shown according to some non-limiting embodiments or aspects. The blend adjustment system 22 may include a blend adjustment processor 36. The blend adjustment processor 36 may communicate with any of the components from FIG. 1 with which the blend adjustment system 22 was described as communicating (e.g., the blend components 12a-12n (e.g., flow streams thereof and/or pumps 18a-18n or flow meters 20a-20n associated therewith), the computing device 24, the historical blend database 26, the sensors 28, 30, and the like).

The blend adjustment processor 36 may communicate with at least one of a cost assessment processor 38, a performance assessment processor 40, and a volume assessment processor 42 to generate the control flow instructions based on a machine learning analysis. The cost assessment processor 38 may be configured to generate at least one predictive model associated with an expected cost of adjusting the initial blend composition to form the modified blend composition. The performance assessment processor 40 may be configured to generate at least one predictive model associated with an expected property of the modified blend composition. The volume assessment processor 42 may be configured to generate at least one predictive model associated with a volume of the modified blend composition upon adjusting the initial blend composition to form the modified blend composition. The proposed control flow instructions may be based on any of the data or combination of data from the cost assessment processor 38, the performance assessment processor 40, and the volume assessment processor 42.

With continued reference to FIG. 2, the cost assessment processor 38, the performance assessment processor 40, and the volume assessment processor 42 may be in communication with a machine learning processor 44. The machine learning processor 44 may be configured to communicate with the cost assessment processor 38, the performance assessment processor 40, and/or the volume assessment processor 42 to perform the suitable machine learning analysis on a cost, performance (e.g., property), and/or a volume, respectively, associated with adjusting the initial blend composition to form the modified blend composition. Machine learning algorithms may be implemented by and/or with the machine learning processor 44 and used to generate the previously-described predictive models.

The machine learning processor 44 may communicate with the historical blend data database 26 to receive the historical blend data. This historical blend data may be used as the test data for use by the machine learning algorithms.

The performance assessment processor 40 may be configured to generate at least one predictive model associated with an expected property of potential modified blend compositions. The performance assessment processor 40 may determine the expected property of the potential modified blend compositions based on the suitable machine learning algorithm from the machine learning processor 44 and the historical blend data from the historical blend data database 26. Based on the expected property of the potential modified blend compositions, the blend adjustment processor 36 may generate the plurality of proposed control flow instructions for forming the modified blend composition, which may be the same or different (the updated target blend composition) from the initially desired blend composition as previously described.

The performance assessment processor 40 and/or the blend adjustment processor 36 may determine whether a blend composition consistent with the initial target blend composition data and/or the updated target blend composition having a different target blend property is to be prepared as the modified blend composition. This may be determined based on whether it is more efficient to form a blend having the initial target blend properties or the updated target blend properties (e.g., also based on output from the cost assessment processor 38 and/or the volume assessment processor 42 as described hereinafter). Determining the updated target blend composition to be prepared may be based on a machine learning analysis of the historical blend data.

In some non-limiting embodiments or aspects, the property of the initial blend composition and the initial target blend property have a first difference, and the property of the initial blend composition and the updated target blend property of the updated target blend composition have a second difference. The first difference and the second difference may be compared to determine whether the modified blend composition should be the blend composition consistent with the initial target blend property and/or the updated target blend composition.

In some non-limiting embodiments or aspects, the performance assessment processor 40 may determine that the property of the initial blend composition and the target blend property have a difference. The historical blend data used in the machine learning algorithm to determine the expected property of potential modified blend compositions may include data associated with a historical blend composition having a substantially similar difference between the same property of the historical blend composition (e.g., an intermediate composition thereof) and a target blend property of the historical blend composition. This substantially similar difference may be less than a 10% difference, such as less than a 5% difference, less than a 3% difference, less than a 1% difference, or a 0% difference. The data associated with a historical blend composition may include control flow instructions associated with preparing the historical blend composition. The control flow instructions may be generated for the blend composition (to prepare the modified blend composition) based on the control flow instructions associated with preparing the historical blend composition. In this way, historical blend compositions having substantially similar differences between target blend property and intermediate and/or final blend properties may be used as informative in the machine learning algorithm for determining adjustments to be made from the initial blend composition to the modified blend composition.

The cost assessment processor 38 may be configured to generate at least one predictive model associated with an expected cost of adjusting the initial blend composition to form the modified blend composition. In response to the blend adjustment system 22 generating a plurality of proposed control flow instructions (e.g., based on the output from the performance assessment processor 40), the cost assessment processor 38 may determine an expected cost associated with each of the plurality of proposed control flow instructions. The cost assessment processor 38 may determine the expected cost associated with each of the plurality of proposed control flow instructions based on the suitable machine learning algorithm from the machine learning processor 44 and the historical blend data from the historical blend data database 26. The historical blend database 26 may include data associated with the cost of each of the blend components 12a-12n (or other components proposed to be added to the initial blend composition) to determine the expected cost associated with each of the plurality of proposed control flow instructions. The control flow instructions to be implemented to prepare the modified blend composition may be based on the cost associated with each of the plurality of proposed control flow instructions.

In some non-limiting embodiments or aspects, the cost assessment processor 38 may determine an expected cost associated with the modified blend composition to be prepared being the blend composition consistent with the initial target blend property and/or the updated target blend composition. The proposed control flow instructions to be implemented (e.g., to make the initial target blend composition and/or the updated target blend composition) may be based on this cost assessment, such that the more cost efficient option may be selected for implementation. In this way, the blend composition with lower expected cost and/or higher expected profit from sale (based on an expected sale price) may be selected for implementation.

The volume assessment processor 42 may be configured to generate at least one predictive model associated with a volume of the modified blend composition upon adjusting the initial blend composition to form the modified blend composition. In response to the blend adjustment system 22 generating a plurality of proposed control flow instructions (e.g., based on the output from the performance assessment processor 40), the volume assessment processor 40 may determine an expected volume of the modified blend composition. The volume assessment processor 40 may determine the expected volume of the modified blend composition associated with each of the plurality of proposed control flow instructions based on the suitable machine learning algorithm from the machine learning processor 44 and the historical blend data from the historical blend data database 26. The historical blend database 26 may include data associated with the volumes of historical blend compositions to determine the expected volume of the modified blend composition associated with each of the plurality of proposed control flow instructions. The control flow instructions to be implemented to prepare the modified blend composition may be based on the expected volume of the modified blend composition associated with each of the plurality of proposed control flow instructions.

In some non-limiting embodiments or aspects, the target blend composition data may include a target volume of blend composition to be prepared. Proposed control flow instructions may include control flow instructions based on a comparison of the expected volume of the modified blend composition and the target volume. This may ensure that enough of the modified blend composition is being prepared to satisfy the target volume and/or may ensure that no excess (or not too much excess) modified blend composition is being prepared. In this way, the selection of the modified blend composition to be prepared may be based on the target volume. The control flow instructions to be implemented to prepare the modified blend composition may be based on the volume associated with each of the plurality of proposed control flow instructions.

In some non-limiting embodiments or aspects, the volume assessment processor 42 may compare a maximum or suggested volume of the blend tank 14 with an expected volume of the modified blend composition. If the expected volume of the modified blend composition exceeds the maximum or suggested volume of the blend tank 14, the volume assessment processor 42 may cause the blend tank 14 to remove at least a portion of the blend composition therein before and/or during the adjustment of the initial blend composition to form the modified blend composition.

In some non-limiting embodiments or aspects, the volume assessment processor 42 may determine an expected volume associated with the modified blend composition to be formed being the blend composition consistent with the initial target blend property and the updated target blend composition. The proposed control flow instructions to be implemented (e.g., to make the initial target composition or the updated target blend composition) may be based on this volume assessment, such that a sufficient volume and/or not an overly excessive volume of blend composition may be prepared.

With continued reference to FIG. 2, the non-limiting example of the blend adjustment system 22 shown therein includes five separately depicted processors (e.g., the blend adjustment processor 36, the cost assessment processor 38, the performance assessment processor 40, the volume assessment processor 42, and the machine learning processor 44). However, it will be appreciated that any of these processors may be combined with any of these other processors, or any of the single processors shown may be further divided into additional processors. For example, the cost assessment processor, performance assessment processor and volume assessment processor may be combined to predict a blend modification that would minimize cost while maximizing product performance and maintaining the target volume.

Figure 3:
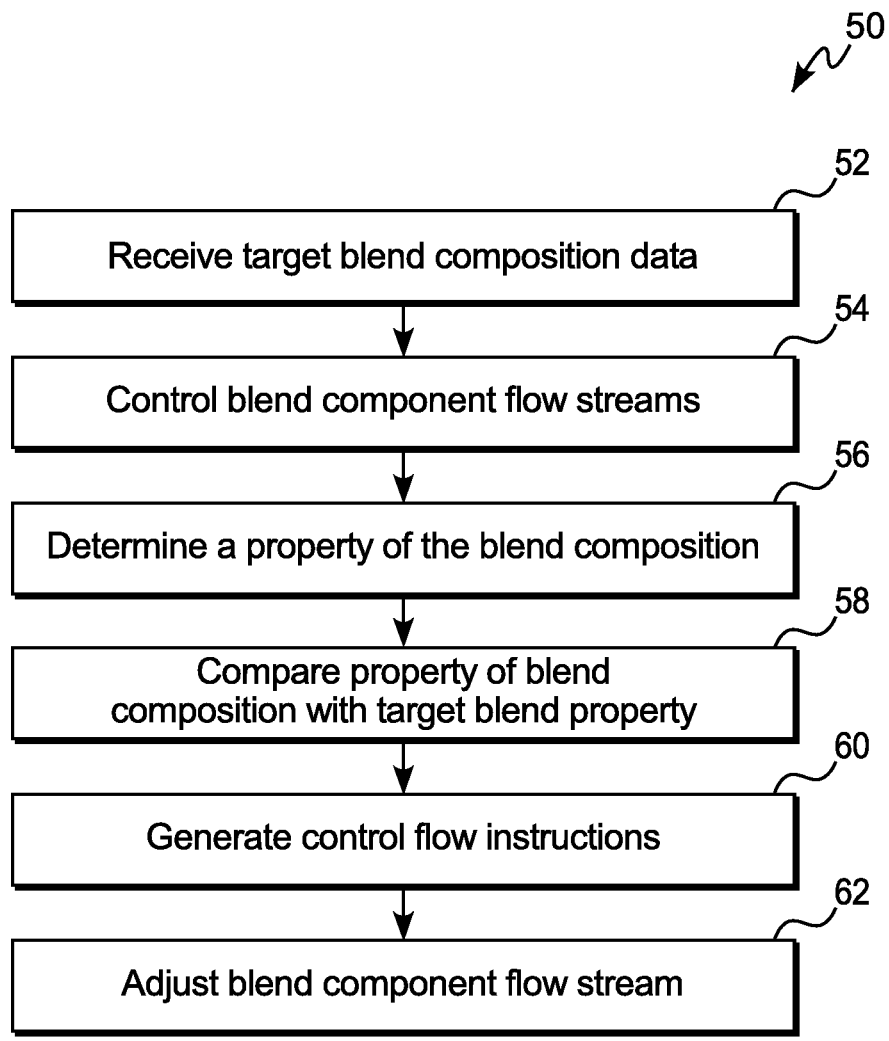
FIG. 3 shows a step diagram of a method for adjusting a blend composition according to some non-limiting embodiments or aspects.

Referring to FIG. 3, a method 50 for adjusting a blend composition is shown according to some non-limiting embodiments or aspects. At a step 52, the blend adjustment system may receive the target blend composition data associated with the target blend composition having the at least one target blend property. The target blend composition may include the plurality of blend components. The target blend composition data may include the target concentration associated with each of the plurality of blend components. At a step 54, the blend adjustment system may control the plurality of blend component flow streams to cause the plurality of blend components to be added to the blend tank to form a blend composition. At a step 56, the blend adjustment system may determine the at least one property of the blend composition.

With continued reference to FIG. 3, at a step 58, the blend adjustment system may compare the at least one property of the blend composition with the at least one target blend property. At a step 60, the blend adjustment system may generate the control flow instructions based on the at least one property of the blend composition and the machine learning analysis of the historical blend data. At a step 62, the blend adjustment system may adjust the at least one blend component flow stream of the plurality of blend component flow streams to form the modified blend composition in the blend tank.

Figure 4:
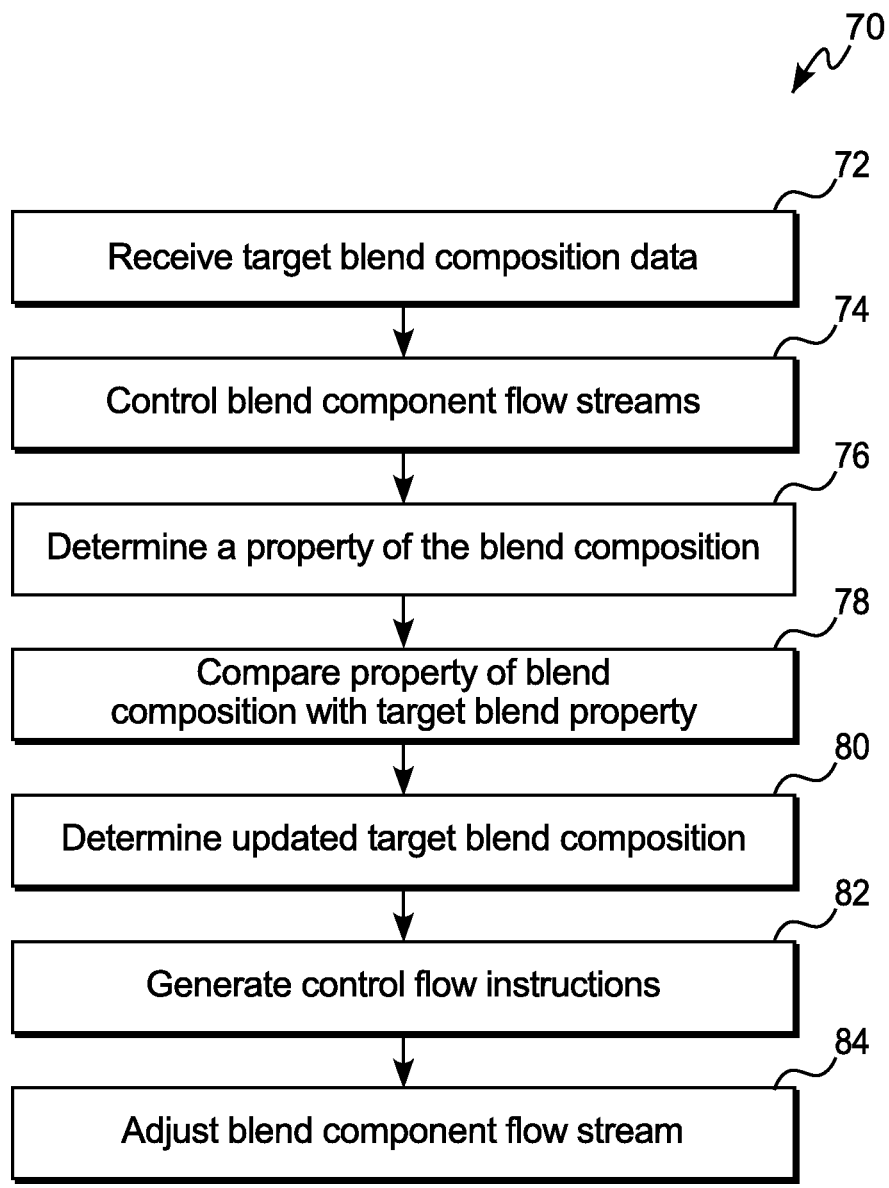
FIG. 4 shows a step diagram of a method for adjusting a blend composition according to some non-limiting embodiments or aspects.

Referring to FIG. 4, a method 70 for adjusting a blend composition is shown according to some non-limiting embodiments or aspects. At a step 72, the blend adjustment system may receive the target blend composition data associated with the target blend composition associated with the first order having the at least one target blend property. The target blend composition may include the plurality of blend components. The target blend composition data may include the target concentration associated with each of the plurality of blend components. At a step 74, the blend adjustment system may control the plurality of blend component flow streams to cause the plurality of blend components to be added to the blend tank to form the blend composition based on the target blend composition. In an non-limiting embodiment, step 74 is only controlling flow based on set points, and not based on any test results or other measurements. At a step 76, the blend adjustment system may determine the at least one property of the blend composition.

With continued reference to FIG. 4, at a step 78, the blend adjustment system may compare the at least one property of the blend composition with the at least one target blend property. At a step 80, the blend adjustment system may determine the updated target blend composition having the at least one updated target blend property. At a step 82, the blend adjustment system may generate the control flow instructions based on the at least one property of the blend composition and the at least one updated target blend property. At a step 84, the blend adjustment system may adjust the at least one blend component flow stream of the plurality of blend component flow streams to form the updated target blend composition in the blend tank.

In a further, non-limiting embodiment or aspect, a computer program product for adjusting a blend composition includes at least one non-transitory computer readable medium including program instructions that, when executed by at least one processor, cause the at least one processor to execute one of the previously-described methods. The at least one processor may include the blend adjustment system, such as any of the blend adjustment processor, the cost assessment processor, the performance assessment processor, the volume assessment processor, and/or the machine learning processor thereof.

EXAMPLE

A blend of multiple polyether polyols is combined with amine and tin catalysts, surfactants, water, and dye. A customer expects the hydroxyl number to be within a narrow range, and further expects water and nitrogen levels, and has a reactivity specification to maximize the product performance. Production of 40,000 lb batch is scheduled. During production, a sensor detects the presence of too much hydroxyl. A machine learning model based on raw material information, historical data, and a cost minimization/performance maximization to add specific components at specific weights to the blend is utilized. The model determines two polyols should be added, in equal proportion to the original formulation, while adding a small amount of catalyst to optimize the reactivity performance rating. This solution minimizes cost by using a large amount of relatively inexpensive polyol, compared to other solutions which require adding a high-hydroxyl surfactant, which would also satisfy the criteria, but at a higher cost. In this solution, cost is minimized, while maximizing performance. Furthermore, the total weight of the batch, even with the added solution, remains below the overflow threshold.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method for adjusting a blend composition, comprising:

receiving, with at least one processor, target blend composition data associated with a target blend composition associated with a first order having at least one target blend property, wherein the target blend composition comprises a plurality of blend components, and the target blend composition data comprises a target concentration associated with each of the plurality of blend components;

controlling, with at least one processor, a plurality of blend component flow streams to cause the plurality of blend components to be added to a blend tank to form a blend composition;

determining, with at least one processor, at least one property of the blend composition;

comparing, with at least one processor, the at least one property of the blend composition with the at least one target blend property;

determining an updated target blend composition having at least one updated target blend property;

generating, with at least one processor, control flow instructions based on the at least one property of the blend composition and the at least one updated target blend property; and adjusting, with at least one processor, at least one blend component flow stream of the plurality of blend component flow streams to form the updated target blend composition in the blend tank;

wherein the updated target blend composition is associated with a second order different from the first order.

2. The method of claim 1, wherein determining the updated target blend composition is based on the at least one property of the blend composition and a machine learning analysis of historical blend data.

3. The method of claim 2, wherein the historical blend data comprises historical blend data associated with the updated target blend composition.

4. The method of claim 1, wherein the at least one property of the blend composition and the at least one target blend property have a first difference, wherein the at least one property of the blend composition and the at least one updated target blend property of the updated target blend composition have a second difference, wherein the method further comprises comparing the first difference and the second difference.

5. The method of claim 1, further comprising:

generating, with at least one processor, proposed control flow instructions to achieve the target blend composition and proposed control flow instructions to achieve the updated target blend composition; and determining, with at least one processor, a cost associated with each of the proposed control flow instructions to achieve the target blend composition and the proposed control flow instructions to achieve the updated target blend composition.

6. The method of claim 5, further comprising:

determining, with at least one processor, that the cost associated with the proposed control flow instructions to achieve the target blend composition exceeds the cost associated with the proposed control flow instructions to achieve the updated target blend composition.

7. The method of claim 1, wherein generating the control flow instructions comprises:

generating, with at least one processor, a plurality of proposed control flow instructions to achieve the updated target blend composition or the at least one updated target blend property;

determining, with at least one processor, a cost associated with each of the plurality of proposed control flow instructions; and generating the control flow instructions based on the cost associated with each of the plurality of proposed control flow instructions.

8. The method of claim 7, wherein generating the plurality of proposed control flow instructions to achieve the updated target blend composition or the at least one updated target blend property is based on a machine learning analysis of historical blend data.

9. The method of claim 1, wherein the plurality of blend components are non-reactive with one another to form the updated target blend composition.

10. A method for adjusting a blend composition, comprising:

receiving, with at least one processor, target blend composition data associated with a target blend composition associated with a first order having at least one target blend property, wherein the target blend composition comprises a plurality of blend components, and the target blend composition data comprises a target concentration associated with each of the plurality of blend components;

controlling, with at least one processor, a plurality of blend component flow streams to cause the plurality of blend components to be added to a blend tank to form a blend composition;

determining, with at least one processor, at least one property of the blend composition;

comparing, with at least one processor, the at least one property of the blend composition with the at least one target blend property;

determining an updated target blend composition having at least one updated target blend property;

generating, with at least one processor, control flow instructions based on the at least one property of the blend composition and the at least one updated target blend property; and adjusting, with at least one processor, at least one blend component flow stream of the plurality of blend component flow streams to form the updated target blend composition in the blend tank, wherein the at least one property of the blend composition and the at least one target blend property have a first difference, wherein the at least one property of the blend composition and the at least one updated target blend property of the updated target blend composition have a second difference, wherein the method further comprises comparing the first difference and the second difference.

11. The method of claim 10, wherein determining the updated target blend composition is based on the at least one property of the blend composition and a machine learning analysis of historical blend data.

12. The method of claim 11, wherein the historical blend data comprises historical blend data associated with the updated target blend composition.

13. The method of claim 10, further comprising:
generating, with at least one processor, proposed control flow instructions to achieve the target blend composition and proposed control flow instructions to achieve the updated target blend composition; and
determining, with at least one processor, a cost associated with each of the proposed control flow instructions to achieve the target blend composition and the proposed control flow instructions to achieve the updated target blend composition.

14. The method of claim 13, further comprising:
determining, with at least one processor, that the cost associated with the proposed control flow instructions to achieve the target blend composition exceeds the cost associated with the proposed control flow instructions to achieve the updated target blend composition.

15. The method of claim 10, wherein generating the control flow instructions comprises:
generating, with at least one processor, a plurality of proposed control flow instructions to achieve the updated target blend composition or the at least one updated target blend property;
determining, with at least one processor, a cost associated with each of the plurality of proposed control flow instructions; and
generating the control flow instructions based on the cost associated with each of the plurality of proposed control flow instructions.

16. The method of claim 15, wherein generating the plurality of proposed control flow instructions to achieve the updated target blend composition or the at least one updated target blend property is based on a machine learning analysis of historical blend data.

17. The method of claim 10, wherein the plurality of blend components are non-reactive with one another to form the updated target blend composition.

* * * * *